United States Patent [19]

Rose et al.

[11] Patent Number: 4,735,731

[45] Date of Patent: Apr. 5, 1988

[54] PROCESS FOR REVERSIBLE THICKENING OF A LIQUID

[75] Inventors: Gene D. Rose; Arthur S. Teot; Peter A. Doty, all of Midland, Mich.

[73] Assignee: The Dow Chemical Company, Midland, Mich.

[21] Appl. No.: 851,754

[22] Filed: Apr. 14, 1986

Related U.S. Application Data

[63] Continuation-in-part of Ser. No. 621,030, Jun. 15, 1984, abandoned.

[51] Int. Cl.$^4$ .................. B01D 17/00; B01J 13/00; C09K 7/00; F17D 1/16
[52] U.S. Cl. .................................. 252/8.51; 137/13; 210/712; 210/729; 252/8.511; 252/8.514; 252/8.551; 252/303; 252/326; 252/327; 406/48; 406/197
[58] Field of Search .................. 252/8.51, 8.511, 8.551, 252/303, 326, 327; 137/13; 210/712, 729; 406/48, 197

[56] References Cited

U.S. PATENT DOCUMENTS

| | | | |
|---|---|---|---|
| 3,172,910 | 3/1965 | Brace | 562/605 |
| 3,361,213 | 1/1968 | Savins | 137/13 X |
| 3,373,107 | 3/1968 | Rice et al. | 137/13 X |
| 3,406,115 | 10/1968 | White | 252/8.514 |
| 3,775,126 | 11/1973 | Babbitt et al. | 106/125 X |
| 3,977,472 | 8/1976 | Graham et al. | 252/8.551 X |
| 4,071,457 | 1/1978 | Meister | 252/8.551 X |
| 4,221,229 | 9/1980 | Dreher et al. | 137/13 |
| 4,430,230 | 2/1984 | Satake | 210/708 X |
| 4,456,537 | 6/1984 | Oliver, Jr. et al. | 252/8.551 |

FOREIGN PATENT DOCUMENTS 2013358  10/1971  Fed. Rep. of Germany ...... 252/303

OTHER PUBLICATIONS

S. Gravsholt: "Viscoelasticity in Highly Dilute Aqueous Solutions of Pure Cationic Detergents", *J. of Coll. and Interface Sci.*, 57 (3), pp. 575–577 (1976).

Zakin et al.: "Variables Affecting Drag Reduction by Nonionic Surfactant Additives", *Chem. Eng. Commun.*, 23, 77–88 (1983).

*Primary Examiner*—Richard D. Lovering

[57] ABSTRACT

Industrial liquids containing viscoelastic surfactant compositions can be reversibly thickened and broken. For example, a thickened industrial liquid can exhibit good solids carrying capacity, and after the viscosity of the liquid is broken, using techniques such as change in pH, addition of a hydrocarbon, change in temperature, etc., the solids can be easily removed therefrom. Viscosity can be again provided to the industrial liquid without the necessity of adding substantial amounts of additional thickener.

38 Claims, No Drawings

PROCESS FOR REVERSIBLE THICKENING OF A LIQUID

CROSS-REFERENCE TO RELATED APPLICATIONS

This application is a continuation-in-part of application Ser. No. 621,030 filed June 15, 1984, now abandoned.

BACKGROUND OF THE INVENTION

The present invention relates to a process for providing reversibly thickened liquids for use in various industrial applications.

In many industrial processes it would be useful to have a process for reversibly thickening a liquid. Examples of these processes are slurry pipeline transport of minerals, removal of the solids produced during the drilling of wells, removal of solids formed during the polishing and grinding of metals, etc. In processes such as these it is advantageous to increase the viscosity of the liquid in order to enhance its solids carrying capacity and to prevent settling out of the solids before they reach their desired destination. The most common method for increasing a liquid's solids carrying capacity is to add a polymer or dispersed solid such as a clay which increases the viscosity of the liquid, particularly at low shear rates. However, in the processes mentioned above it is also necessary to remove the solids from the liquid either to reuse the liquid or to use the solids. This is often done by filtering the liquid from the solids, centrifuging the solids out of the liquid, etc. Unfortunately, the additional viscosity which was useful in transporting the solids also makes the desired separation of the solids from the liquid more difficult. Furthermore, if the viscosity is reduced by the destruction or removal of the polymer or clay used to increase the viscosity of the liquid, additional polymer or clay is needed to restore the liquid's solid carrying capacity. Also, the liquid or solid can be contaminated and interfere with further use by the residue resulting from the use of polymer or clay.

In view of the deficiencies of the prior art, it would be highly desirable to provide a process for improving the solids carrying capacity of a liquid in a manner which can be easily and rapidly reversed in order to aid in the removing of solids from the liquid when desired, and after solids have been removed, to easily and rapidly restore said solids carrying capacity.

SUMMARY OF THE INVENTION

Accordingly, in one aspect, the present invention is a method for reversibly altering the viscosity of a liquid, the method comprising the steps of contacting the liquid with an amount of a viscoelastic surfactant sufficient to increase the viscosity of the liquid and breaking the viscosity of the liquid containing the viscoelastic surfactant in a manner such that the liquid does not need to be subjected to increased shear to reduce viscosity and the viscosity of the liquid can subsequently be substantially restored.

Surprisingly, when a viscoelastic surfactant is employed to impart an increased viscosity to a liquid, the viscosity imparted by the viscoelastic surfactant can be effectively reduced (i.e., "broken") and thereafter, the viscosity subsequently restored to the liquid without additional amounts of the viscoelastic surfactant being employed. Alternatively, once the viscosity of a liquid thickened with a soluble high molecular weight polymer has been broken, the viscosity of the liquid cannot be substantially restored without the use of additional amounts of polymer. In addition, the liquids employed in the present invention are highly shear stable and do not experience substantial or any loss of activity with continued pumping whereas polymeric thickened liquids undergo irreversible mechanical degradation and rapid loss of activity with continued pumping. Therefore, the method of the present invention is particularly useful for liquids employed in flowing systems containing pumps, high velocity flows, sudden expansions or contractions, grinding operations, polishing operations and the like.

Among many other uses, thickened liquids are useful in industrial applications where it is desirable to employ a liquid having a high solids carrying capacity and, in another aspect, the present invention is such a method. Specifically, the method comprises thickening the liquid with an amount of a viscoelastic surfactant sufficient to provide the liquid with an improved solids carrying capacity over an unthickened liquid, suspending solids in the thickened liquid, and subsequently breaking the viscosity of the liquid such that the solids can more effectively be removed from the liquid than from the thickened liquid.

The method for removing solids is particularly useful in closed loop, continuously circulating processes, e.g., in the removal of solids from a wellbore drilling liquid. The method provides (1) in a portion of the closed loop, a thickened liquid for effectively carrying solids, (2) in another portion of the closed loop, an efficient and effective method for removing solids upon breaking the viscosity of the liquid in a manner such that increased shear is not required to reduce the viscosity, and (3) after removal of the solids, restoration of the viscosity and solid carrying capacity to the liquid in still another portion of the loop. Thus, a continuous and efficient process can be performed wherein it is unnecessary to add substantial amounts, if any, of additional viscosifier to the system after repeated breaking and restoration of viscosity of the liquid in order to provide a liquid having a functionally effective viscosity.

DETAILED DESCRIPTION OF THE INVENTION

As used herein, the term "liquid" refers to those liquid materials which can be employed in industrial applications. Liquids can be organic or aqueous in nature. Most preferably, the liquid is an aqueous liquid. As used herein, the term "aqueous liquid" refers to those liquids which contain water. Included within the term are aqueous liquids containing inorganic electrolytes, such as aqueous solutions of inorganic salts, aqueous alkaline or aqueous acidic solutions, depending upon the particular surfactant and electrolyte employed. Other exemplary aqueous liquids include mixtures of water and a water-miscible liquid such as lower alkanols, e.g., methanol, ethanol or propanol; glycols and polyglycols and the like, provided that such water-miscible liquids are employed in amounts that do not significantly and deleteriously affect the thickening effect of the viscoelastic surfactant on the liquid. Also included are emulsions of immiscible liquids in the aqueous liquid and aqueous slurries of solid particulates. In general, however, water and aqueous alkaline, aqueous acidic or aqueous inorganic salt solutions (i.e., brine solutions) are most beneficially employed as the aqueous liquid herein. Advantageously, the electrolyte concentration is less than about 75 percent by weight of the solution.

The term "viscoelastic surfactant" is meant to include compounds broadly classified as surfactants which are capable of imparting viscoelasticity to a liquid. The property of viscoelasticity is well-known in the art and reference is made to H. A. Barnes et al., *Rheol. Acta*, 1975 14, pp. 53–60 and S. Gravsholt, *Journal of Coll. and Interface Sci.*, 57 (3) pp. 575–6 (1976), which are hereby incorporated by reference for a definition of viscoelasticity and tests to determine whether a liquid possesses viscoelastic properties. See also, N. D. Sylvester et al., *Ind. Eng. Chem. Prod. Res. Dev.*, 1979, 14, p. 47. Of the test methods specified by these references, one test which has been found to be most useful in determining the viscoelasticity of an aqueous solution consists of swirling the solution and visually observing whether the bubbles created by the swirling recoil after the swirling is stopped. Any recoil of the bubbles indicates viscoelasticity.

Surfactants which are capable of imparting viscoelastic properties to a liquid are well-known in the art and reference is made thereto for the purposes of this invention. Illustrative of references which teach viscoelastic surfactants are U.S. Pat. Nos. 3,361,213; 3,273,107; 3,406,115 4,061,580 and 4,534,875. The term "surfactant" is used in its broadest sense herein and is meant to include any molecule having a characteristic amphiphatic structure such that it has the property of forming colloidal clusters, commonly called micelles, in solution.

The viscoelastic surfactants can be either ionic or nonionic. In general, an ionic viscoelastic surfactant comprises a surfactant compound having a hydrophobic moiety chemically bonded to an ionic, hydrophilic moiety (hereinafter referred to as a "surfactant ion") and an amount of a counterion having a moiety capable of associating with the surfactant ion sufficient to form a viscoelastic surfactant. A nonionic viscoelastic surfactant comprises a surfactant molecule having a hydrophobic moiety chemically bonded to a nonionic, hydrophilic moiety.

Examples of ionic surfactant compounds are represented by the formula:

$$R_1(Y^\oplus)X^\ominus$$

or $$R_1(Z^\ominus)A^\oplus$$

wherein $R_1(Y^\oplus)$ and $R_1(Z^\ominus)$ represent surfactant ions having a hydrophobic moiety represented by $R_1$ and an ionic, solubilizing moiety represented by the cationic moiety $(Y^\oplus)$ or the anionic moiety $(Z^\ominus)$ chemically bonded thereto. $X^\ominus$ and $A^\oplus$ are the counterions associated with the surfactant ions.

In general, the hydrophobic moiety (i.e., $R_1$) of the surfactant ion is hydrocarbyl or inertly substituted hydrocarbyl wherein the term "inertly substituted" refers to hydrocarbyl radicals having one or more substituent groups, e.g., halo groups such as —F, —Cl or —Br or chain linkages, such as a silicon linkage (—Si—), which are inert to the aqueous liquid and components contained therein. Typically, the hydrocarbyl radical is an aralkyl group or a long chain alkyl or inertly-substituted alkyl, which alkyl groups are generally linear and have at least about 12, advantageously at least about 16, carbon atoms. Representative long chain alkyl and alkenyl groups include dodecyl (lauryl), tetradecyl (myristyl), hexadecyl (cetyl), octadecenyl (oleyl), octadecyl (stearyl) and the derivatives of tallow, coco and soya. Preferred alkyl and alkenyl groups are generally alkyl and alkenyl groups having from about 14 to about 24 carbon atoms, with octadecenyl, hexadecyl, erucyl and tetradecyl being the most preferred.

The cationic, hydrophilic moieties (groups), i.e., $(Y^\oplus)$, are generally onium ions wherein the term "onium ions" refers to a cationic group which is essentially completely ionized in water over a wide range of pH, e.g., pH values from about 2 to about 12. Representative onium ions include quaternary ammonium groups, i.e., $-N^\oplus(R)_3$; tertiary sulfonium groups, i.e., $-S^\oplus(R)_2$; quaternary phosphonium groups, i.e., $-P^\oplus(R)_3$ and the like, wherein each R is individually a hydrocarbyl or substituted hydrocarbyl. In addition, primary, secondary and tertiary amines, i.e., $-NH_2$, $-NHR$ or $-N(R)_2$, can also be employed as the ionic moiety if the pH of the aqueous liquid being used is such that the amine moieties will exist in ionic form. A pyridinium moiety can also be employed. Of such cationic groups, the surfactant ion of the viscoelastic surfactant is preferably prepared having quaternary ammonium, i.e., $-N^\oplus(R)_3$; a pyridinium moiety; an aryl- or alkaryl- pyridinium; or imidazolinium moiety; or tertiary amine, $-N(R)_2$, groups wherein each R is independently an alkyl group or hydroxyalkyl group having from 1 to about 4 carbon atoms, with each R preferably being methyl, ethyl or hydroxyethyl.

Representative anionic, solubilizing moieties (groups) $(Z^\ominus)$ include sulfate groups, i.e., $-OSO_3^\ominus$, ether sulfate groups, sulfonate groups, i.e., $-SO_3^\ominus$, carboxylate groups, phosgroups, phate groups, phosphonate groups, and phosphonite groups. Of such anionic groups, the surfactant ion of the viscoelastic surfactants is preferably prepared having a carboxylate or sulfate group. For purposes of this invention, such anionic solubilizing moieties are less preferred than cationic moieties.

Fluoroaliphatic species suitably employed in the practice of this invention include organic compounds represented by the formula:

$$R_fZ^1$$

wherein $R_f$ is a saturated or unsaturated fluoroaliphatic moiety, preferably containing a $F_3C-$ moiety and $Z^1$ is an ionic moiety or potentially ionic moiety. The fluoroaliphatics can be perfluorocarbons. Suitable anionic and cationic moieties will be described hereinafter. The fluoroaliphatic moiety advantageously contains from about 3 to about 20 carbons wherein all can be fully fluorinated, preferably from about 3 to about 10 of such carbons. This fluoroaliphatic moiety can be linear, branched or cyclic, preferably linear, and can contain an occasional carbon-bonded hydrogen or halogen other than fluorine, and can contain an oxygen atom or a trivalent nitrogen atom bonded only to carbon atoms in the skeletal chain. More preferable are those linear perfluoroaliphatic moieties represented by the formula: $C_nF_{2n+1}$ wherein n is in the range of about 3 to about 10. Most preferred are those linear perfluoroaliphatic moieties represented in the paragraphs below.

The fluoroaliphatic species can be a cationic perfluorocarbon and is preferably selected from a member of the group consisting of $CF_3(CF_2)_rSO_2NH(CH_2)_sN^\oplus R''_3X^\ominus$;

$R_fCH_2CH_2SCH_2CH_2N^{\oplus}R''_3X^{\ominus}$ and $CF_3(CF_2)_rCONH(CH_2)_sN^{\oplus}R''_3X^{\ominus}$; wherein X is a counterion described hereinafter, R" is lower alkyl containing between 1 and about 4 carbon atoms, r is about 2 to about 15, preferably about 2 to about 6, and s is about 2 to about 5. Examples of other preferred cationic perfluorocarbons, as well as methods of preparation, are those listed in U.S. Pat. No. 3,775,126.

The fluoroaliphatic species can be an anionic perfluorocarbon and is preferably selected from a member of the group consisting of $CF_3(CF_2)_pSO_2O^{\ominus}A^{\oplus}$, $CF_3(CF_2)_pSO_2NH(CH_2)_qSO_2O^{\ominus}A^{\oplus}$, $CF_3(CF_2)_pCOO^{\ominus}A^{\oplus}$ and $CF_3(CF_2)_pSO_2NH(CH_2)_qCOO^{\ominus}A^{\oplus}$; wherein p is from about 2 to about 15, preferably about 2 to about 6, q is from about 2 to about 4, and $A^{\oplus}$ is a counterion described hereinafter. Examples of other preferred anionic perfluorocarbons, as well as methods of preparation, are illustrated in U.S. Pat. No. 3,172,910.

The counterions (i.e., $X^{\ominus}$ or $A^{\oplus}$) associated with the surfactant ions are most suitably ionically charged, organic materials having ionic character opposite that of the surfactant ion, which combination of counterion and surfactant ion imparts viscoelastic properties to an aqueous liquid. The organic material having an anionic character serves as the counterion for a surfactant ion having a cationic, hydrophilic moiety, and the organic material having a cationic character serves as the counterion for the surfactant ion having an anionic, hydrophilic moiety. In general, the preferred counterions exhibiting an anionic character contain a carboxylate, sulfonate or phenoxide group wherein a "phenoxide group" is $ArO^{\ominus}$ and Ar represents an aromatic ring or inertly-substituted aromatic ring. Representative of such anionic counterions which, when employed with a cationic surfactant ion, are capable of imparting viscoelastic properties to an aqueous liquid include various aromatic carboxylates such as o-hydroxybenzoate; m- or p-chlorobenzoate, methylene bis-salicylate and 3,4- or 3,5-dichlorobenzoate; aromatic sulfonates such as p-toluene sulfonate and naphthalene sulfonate; phenoxides, particularly substituted phenoxides; and the like, where such counterions are soluble; or 4-amino-3,5,6-trichloropicolinate. Alternatively, the cationic counterions can contain an onium ion, most preferably a quaternary ammonium group. Representative cationic counterions containing a quaternary ammonium group include benzyl trimethyl ammonium or alkyl trimethyl ammonium wherein the alkyl group can be octyl, decyl, dodecyl, erucyl, and the like; and amines such as cyclohexylamine and hydroxyethyl cyclohexylamine. It is highly desirable to avoid stoichiometric amounts of surfactant and counterion when the alkyl group of the counterion is large. The use of a cation as the counterion is generally less preferred than the use of an anion as the counterion. Inorganic counterions, whether anionic or cationic, can also be employed.

The specific type and amount of surfactant ion and counterion employed to prepare a viscoelastic surfactant are interrelated and are selected such that the combination imparts viscoelastic properties to an aqueous liquid. The combinations of surfactant ions and counterions which will form a viscoelastic surfactant will vary and are easily determined by the test methods hereinbefore described.

Of the various surfactant ions and counterions which can be employed in preparing a viscoelastic surfactant, the preferred viscoelastic surfactants include those represented by the formula:

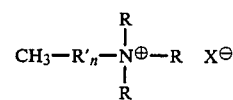

wherein R' is saturated or unsaturated alkyl; and n is an integer from about 13 to about 23, preferably an integer from about 15 to about 21, representing the number of carbon atoms in R'; each R is independently hydrogen or an alkyl group, or alkylaryl, or a hydroxyalkyl group having from 1 to about 4 carbon atoms, preferably each R is independently methyl, hydroxyethyl, ethyl or benzyl, and $X^{\ominus}$ is o-hydroxy benzoate, m- or p-halobenzoate or an alkylphenate wherein the alkyl group is advantageously from 1 to about 4 carbon atoms. In addition, the R groups can form a pyridinium moiety. Especially preferred surfactant ions include cetyltrimethylammonium, oleyltrimethylammonium, erucyltrimethylammonium and cetylpyridinium.

Other preferred surfactant compounds include those represented by the formula:

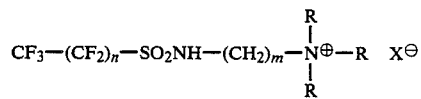

wherein n is an integer from about 3 to about 15, preferably from about 3 to about 8; m is an integer from about 2 to about 10, preferably from about 2 to about 5; R is as previously defined, most preferably methyl; and $X^{\ominus}$ is as previously defined.

The viscoelastic surfactants are easily prepared by admixing the basic form of the desired cationic surfactant ion (or acidic form of the desired anionic surfactant ion) with the desired amount of the acidic form of the desired cationic counterion (or the basic form of the desired anionic counterion). Alternatively, the desired amounts of the salts of the cationic surfactant ion and the anionic counterion (or equimolar amounts of the anionic surfactant ion and cationic counterion) can be admixed to form the desired viscoelastic surfactant. See, for example, the procedures described in U.S. Pat. No. 2,541,816.

Depending on the specific surfactant ion and counterion associated therewith, less than a stoichiometric amount of the counterion can be employed to impart viscoelastic properties to a liquid. For example, when the surfactant ion is a long chain alkyl bonded to a quaternary ammonium and the counterion is salicylate, although greater than stoichiometric amounts of an electrolyte which generates, upon dissociation, a salicylate anion, can be employed, water and other aqueous liquids can be effectively thickened using stoichiometric or even lesser amounts of the electrolyte. However, in many instances, particularly when the counterion is an inorganic ion such as chloride ion, viscoelastic properties are imparted to an aqueous liquid only when an electrolyte is employed in stoichiometric excess. For example, in such instances, the surfactant may not impart desired viscoelastic properties to water, but will impart desired viscoelastic properties to a salt solution such as brine. As the term is used herein, "viscoelastic surfactant" refers only to the surfactant ion and that amount of counterion actually employed if the counterion is employed in stoichiometric or lesser amounts. If more than stoichiometric amount of electrolyte is employed to the surfactant ion, the term "viscoelastic surfactant" refers to the surfactant ion and stoichiometric amount of counterion (i.e., it excludes the excess amount, if any, of electrolyte).

In general, surfactant compounds having a hydrophobic moiety chemically bonded to a nonionic, hydrophilic moiety are those nonionic surfactants which exhibit a viscoelastic character, and are typically described in U.S. Pat. No. 3,373,107 and those alkylphenoxy ethoxylates as are described by Shinoda in *Solvent Properties of Surfactant Solutions*, Marcel Dekker, Inc. (1967) and Zakin, J. L. and Liu, H. L. in "Variables Affecting Drag Reduction by Nonionic Surfactant Additives", *Chem. Eng. Commun.*, Vol. 23, pp. 77–88 (1983), which are incorporated herein by reference. Preferred nonionic surfactants are those tertiary amine oxide surfactants which exhibit viscoelastic character. In general, the hydrophobic moiety can be represented as the previously described $R_1$. It is also desirable to employ an additive such as an alkanol in the aqueous liquid to which the nonionic surfactant is added in order to render the surfactant viscoelastic.

Other viscoelastic surfactants which can be employed in the process of this invention are described by D. Saul et al., *J. Chem. Soc*, Faraday Trans., 1 (1974) 70(1), pp. 163–170; or C. A. Barker et al., ibid., pp. 154–162.

The viscoelastic surfactant (whether ionic or nonionic in character) is employed in an amount sufficient to measurably increase the viscosity of the liquid in which it is employed. The amount of the viscoelastic surfactant most advantageously employed will vary depending on a variety of factors including the desired viscosity of the liquid, the solution composition and the end use application of the liquid, including the temperatures and shear rates to which the flowing liquid will be exposed. In aqueous liquids, the viscoelastic surfactant is generally employed in a sufficient amount such that the liquid's viscosity is at least about 100, preferably at least about 250, more preferably at least about 500, centipoise at 25° C. when measured using a Brookfield viscometer, LVT type, Spindle No. 1 at 6 rpm. In general, the concentration of any specific viscoelastic surfactant employed to impart the desired viscosity in the liquid is easily determined by experimentation. In general, the viscoelastic surfactants are preferably employed in amounts ranging from about 0.01 to about 10 weight percent based on the weight of the viscoelastic surfactant and liquid. The viscoelastic surfactant is more preferably employed in amounts from about 0.05 to about 3 percent based on the weight of the liquid and the viscoelastic surfactant.

As mentioned, the viscoelastic surfactant can be prepared using greater than stoichiometric amounts of an electrolyte having an ionic character opposite to that of the surfactant ion and which is capable of being associated as a counterion (e.g., an organic counterion) with the surfactant ion. The use of additional electrolyte soluble in the liquid containing the viscoelastic surfactant will also allow the liquid to maintain its viscosity at a higher temperature and/or increase the resistance of the thickened liquid to the presence of oils or other water-insoluble materials such as hydrocarbons which may come into contact with the liquid as well as various water-soluble materials such as the lower alcohols and the like. For example, it is possible for the thickened liquid to contain oil or other organic material in a concentration of about 0.05 to about 80 weight percent based on the total weight of the thickened liquid and oil or other organic material. In general, the viscoelastic properties, and hence, the viscosity, of the liquid tend to be lost or significantly reduced in the presence of such materials. Liquids containing the viscoelastic surfactant and excess amounts of electrolyte are capable of maintaining their viscoelastic properties for longer periods of time than a similar liquid which does not contain the excess amounts of electrolyte. Fluorinated viscoelastic surfactants are more resistant to the presence of organic materials and are capable of withstanding the addition of many organic materials in amounts up to 80 weight percent, most preferably up to about 20 weight percent, based on the weight of the thickened liquid (i.e., the liquid and the fluorinated surfactant).

In general, electrolytes (including salts, acids and bases) which form, upon dissociation, organic ions with the surfactant ion to form a viscoelastic surfactant are preferred. For example, the oil resistance and/or temperature resistance of a liquid containing a viscoelastic surfactant having a cationic surfactant ion can often be increased using an organic electrolyte which, upon dissociation, forms an anion. Example of such anionic organic electrolytes include the alkali metal salts of various aromatic carboxylates, e.g., sodium salicylate and potassium salicylate and disodium methylene-bis(-salicylate); alkali metal ar-halobenzoates, e.g., sodium p-chlorobenzoate, potassium m-chlorobenzoate, sodium 2,4-dichlorobenzoate and potassium 3,5-dichlorobenzoate; aromatic sulfonic acids such as p-toluene sulfonic acid and the alkali metal salts thereof; naphthalene sulfonic acid; substituted phenols and alkali metal salts thereof, e.g., ar,ar-diohlorophenols, 2,4,5-triohlorophenol, t-butylphenol, t-butylhydroxyphenol, ethylphenol, and the like.

Alternatively, the oil and/or temperature resistance of a liquid containing a viscoelastic surfactant having an anionic surfactant ion can often be increased using a cationic organic electrolyte which, upon dissociation, forms a cation. While cationic organic electrolytes are less preferred than the aforementioned anionic organic electrolytes, examples of suitable cationic electrolytes include the quaternary ammonium salts such as alkyl trimethylammonium halides and alkyl triethylammonium halides wherein the alkyl group can contain 4 to 22 carbons and the halide advantageously is chloride; aryl and aralkyl trimethyl ammonium halides such as phenyl trimethyl and benzyl trimethyl ammonium chloride; alkyl trimethyl phosphonium halides and the like.

Preferably, the electrolyte is the same or generates the same ion associated with the surfactant ion of the viscoelastic surfactant contained in the aqueous liquid, e.g., alkali metal salicylate is advantageously employed as the additional electrolyte when the viscoelastic surfactant originally has a salicylate counterion. The most preferred organic electrolytes are the alkali metal salts of an aromatic carboxylate, for example, sodium salicylate. However, it is also understood that the electrolyte can be different from the counterion which is employed.

The concentration of the electrolyte required in the liquid to increase the temperature to which the liquid will maintain its viscoelastic properties, and hence, its voscosity, is dependent on a variety of factors including the particular liquid, viscoelastic surfactant and electrolyte (e.g., organic electrolyte) employed, and the achieved viscosity desired. In general, the concentration of the electrolyte will advantageously range from about 0.1 to about 20, preferably from about 0.5 to about 5, moles per mol of the viscoelastic surfactant.

The liquids useful in this invention which exhibit the desired reversible viscosifying properties when used in industrial applications are prepared by admixing the desired amounts of the viscoelastic surfactant and, if employed, additional electrolyte to form a liquid solution. Alternatively, the nonionic surfactant is contacted with the liquid to form an aqueous liquid solution. The resulting solutions are stable and can be stored for long periods of time. The liquids can also contain additives in order that the liquid can be employed for numerous industrial purposes. Examples of industrial uses include drilling, completion, workover and fracturing liquids, cutting liquids, pipeline applications, slurry transport, district heating applications and the like.

The term "breaking" as used herein refers to a measurable reduction in the viscosity of the liquid containing the viscoelastic surfactant composition. The viscosity of liquids thickened with viscoelastic surfactants can be broken by a variety of means. For example, aqueous liquids thickened with hydrocarbyl or inertly-substituted hydrocarbyl viscoelastic surfactants can be broken through the addition of effective amounts of a miscible or immiscible hydrocarbon or substituted hydrocarbon such as methanol, ethanol, isopropanol, (i.e., lower alcohols) acetone, methylethylketone, trichloroethylene, toluene, xylenes, mineral oils, glycols, glycol ethers, and the like. Aqueous liquids containing the fluoroaliphatic species as viscoelastic surfactant components can be broken effectively using lower alcohols (i.e., alcohols having from 1 to about 3 carbon atoms) such as isopropanol. The amount of the hydrocarbon or substituted hydrocarbon which must be added to break the viscosity of the thickened liquid is dependent upon the specific viscoelastic surfactant employed and its concentration as well as the specific hydrocarbon or substituted hydrocarbon employed. For example, as little as 0.1 percent, by weight, based on the weight of the thickened liquid, of toluene can often be added to the liquid to break its viscosity whereas more than 75 weight percent of ethylene glycol may have to be added to break the same thickened liquid. In most instances, the hydrocarbon or substituted hydrocarbon will advantageously be selected such that it will break the viscosity when added in an amount from about 0.1 to about 50, preferably from about 0.2 to about 20, more preferably from about 0.2 to 10, weight percent based on the weight of the liquid.

Other methods for breaking the viscoelastic surfactant compositions involve changing the pH of the liquid, heating or cooling the system above or below that temperature at which the liquid loses its viscoelasticity, changing the composition of viscoelastic surfactants. Although the application of shear greater than the surfactant micelles can withstand, can also be employed to break the viscoelastic properties imparted to the liquid by the surfactant, the application of excessive shear is not a practical means of reducing the viscosity of the liquid. It is understood that more than one means for breaking the viscoelastic surfactant compositions can be simultaneously employed. Preferably, the viscosity of the liquid is broken by contacting the thickened liquid with an effective amount of hydrocarbon or substituted hydrocarbon. For those compositions containing viscoelastic surfactant compositions designed for use over a wide temperature range, temperature variation is not the best means for breaking the viscoelastic surfactant.

Restoration of the viscosity of the industrial liquid can be accomplished using a variety of techniques. By the term "restoration of viscosity" is meant that the viscosity of the liquid which has been broken can be increased without the necessity of providing additional viscoelastic surfactant to the liquid. Thus, the term "reversible breaking" as used in referring to fluids in this invention refers to the repeated breaking and substantial restoration of viscosity of the original liquid. Examples of techniques useful in reversing the breaking process or restoring viscosity of the liquid include removal of the aforementioned hydrocarbon using techniques such as applying a vacuum and/or heat to the liquid. That is, the hydrocarbon can be removed from the liquid by subjecting the liquid to conditions such that the hydrocarbon vaporizes. For this reason, it is most desirable to employ a hydrocarbon in the breaking process which has a fairly high vapor pressure under conditions of removal. Hydrocarbons can also be removed by absorbing the hydrocarbon using a suitable absorbing material (i.e., one which removes the hydrocarbon but not substantial amounts of the viscoelastic surfactant composition). For example, the hydrocarbon can be removed using polymeric beads, columns containing such beads, carbon, colloidal silica, etc. Other methods for restoring the viscosity of the broken liquid include restoration of pH, heating or cooling the system to the point at which viscoelasticity is restored.

In an aspect of the present invention, a liquid containing a viscoelastic surfactant can be employed to remove suspended particulate material in drilling operations such as the drilling of oil wells without significant downtime or loss of liquid. Specifically, the thickened liquid can be employed to transport the solids and the viscosity of the liquid can subsequently be broken, thereby allowing the easy removal of the solids from the liquid by conventional techniques such as filtration. The viscosity of the broken liquid can then be restored and subjected to reuse.

In a highly preferred embodiment of this aspect of the invention, oil well drilling liquids such as those containing large amounts of brine can be recycled in an efficient and effective manner. Thus, oil well drilling liquids are thickened using the viscoelastic surfactants of this invention, employed to carry cuttings to the surface, broken, subjected to solids removal using conventional means such as vibrating screens, hydrocyclones or centrifuges, subjected to viscosity restoration and recirculated for further use.

The following examples are presented to illustrate the invention and should not be construed to limit its scope. All percentages and parts are by weight unless otherwise noted.

EXAMPLE 1

A thickened brine formulation is prepared by contacting 350 ml of a 13-pound per gallon (ppg) calcium chloride/calcium bromide brine with 3 g of a viscoelastic surfactant composition comprising 1.5 g of tallow trimethyl ammonium chloride, in a 1.5 g isopropanol and water mixture. To the formulation is added 5 g of a clay/quartz solid dust which simulates drill cuttings and is sold commercially as Rev Dust A ® by Millwhite Corporation, Houston, Tex. This sample is designated as Sample No. 1.

In a like manner, but for comparison purposes, is prepared a thickened brine formulation containing clay/quartz, dust and one gram of a hydroxyethyl cellulose polymer rather than a viscoelastic surfactant composition. This sample is designated as Sample No. C-1.

The ability of the liquid containing the viscoelastic surfactant to be broken, processed and restored is illustrated using the following procedure:

Step A: Viscosity of Sample Nos. 1 and C-1 without 5 g of solids are measured using a Fann 35 viscometer at about 24° C. Viscosities are measured at various shear rates varying from 3 to 600 rpm.

Step B: Viscosity of Sample Nos. 1 and C-1 with solids present are measured as in Step A.

Step C: Each of Sample Nos. 1 and C-1 are filtered by placing 200 ml of liquid in a cell, applying 100 psi pressure with nitrogen gas, and measuring the amount of liquid passing through Whatman 50 filter paper over time.

Step D: To each of the samples is added 45 drops of trichloroethylene which is a breaker of the viscoelastic surfactant. The viscosity of samples is measured as described hereinbefore, but at about 29° C.

Step E: Each of the samples are filtered as described in Step C.

Step F: The breaker is removed from the samples processed in Step E by vacuum distilling each sample at 25° C. using a laboratory flask, still and dry ice cold trap attached to a vacuum pump, and further vacuum distilling each sample for five minutes at 65° C. Viscosities of each sample are determined as described hereinbefore at 27.5° C. and 27° C., respectively.

Results are presented in Table I.

The example illustrates that a great excess of one surfactant provides no viscosity to the liquid. Thus, a means for breaking a thickened liquid is provided. The example also illustrates that an equivalent amount of anionic and cationic surfactant provides a means for breaking the liquid if it is desirable to remove the surfactant.

EXAMPLE 3

A liquid which is employed in a thickened state at a high temperature can be reversibly broken by subjecting the liquid to a lower temperature. A simulated drilling liquid is prepared by contacting 1.5 percent cetyl-methyl-bishydroxyethylammonium chloride in a 14.2-pound gallon (ppg) $CaBr_2$ aqueous liquid. The viscosity of the liquid at 85° C. as measured using the Haake Rotovisco Model RV-3 rotational viscometer with an NV cup and bob measuring system at 170 $sec^{-1}$ is 169 cp while at 25° C. the viscosity is 62 cp.

EXAMPLE 4

A thickened aqueous liquid is prepared by dissolving soya bis(2-hydroxyethyl)amine in water such that a 1 percent active surfactant concentration is obtained. The pH of the liquid is altered using hydrochloric acid. In the pH range from 4.8 to 5.7, maximum thickening is observed. At higher and lower pH ranges the liquid exhibits a low viscosity. By adding sodium hydroxide, and alternatively hydrochloric acid, the viscosity of the system can be restored and broken.

EXAMPLE 5

TABLE I

| Sample No. | Viscosity After Step A (rpm) | (cps) | Viscosity After Step B (rpm) | (cps) | Filtrate After Step C (Time) | (ml) | Viscosity After Step D (rpm) | (cps) | Filtrate After Step E (Time) | (ml) | Viscosity After Step F (rpm) | (cps) |
|---|---|---|---|---|---|---|---|---|---|---|---|---|
| C-1* | 600 | 47 | 600 | 47 | 10 | 33 | 600 | 43 | 10 | 38 | 600 | 47 |
|  | 300 | 66 | 300 | 65 | 20 | 54 | 300 | 58 | 20 | 58 | 300 | 64 |
|  | 200 | 78 | 200 | 77 | 30 | 64 | 200 | 69 | 30 | 72 | 200 | 77 |
|  | 100 | 108 | 100 | 105 | — | — | 100 | 93 | — | — | 100 | 105 |
|  | 6 | 350 | 6 | 300 | — | — | 6 | 250 | — | — | 6 | 300 |
|  | 3 | 450 | 3 | 400 | — | — | 3 | 300 | — | — | 3 | 400 |
| 1 | 600 | 28 | 600 | 23 | 10 | 14 | 600 | 8 | 10 | 75 | 600 | 26 |
|  | 300 | 41 | 300 | 34 | 20 | 20 | 300 | 8 | 20 | 122 | 300 | 33 |
|  | 200 | 52 | 200 | 43 | 30 | 24 | 200 | 9 | 30 | 156 | 200 | 38 |
|  | 100 | 74 | 100 | 60 | — | — | 100 | 9 | — | — | 100 | 48 |
|  | 6 | 325 | 6 | 250 | — | — | 6 | 25 | — | — | 6 | 100 |
|  | 3 | 400 | 3 | 300 | — | — | 3 | 20 | — | — | 3 | 100 |

*Not an example of the invention.

The data in Table I indicate that a thickened sample is difficult to filter (i.e., Step C). However, the viscosity of the thickened sample can be broken, (i.e., Step D), the sample easily filtered (i.e., Step E), and viscosity can be substantially restored (i.e., Step F).

EXAMPLE 2

To 100 g of a 0.01 N cetyltrimethylammonium chloride aqueous solution, which exhibits a viscosity similar to water, is added 0.22 to 0.34 g of a 50 percent active anionic surfactant (dodecyl diphenyloxide disulfonate) in water, and the solution becomes highly viscous. However, as 0.59 g of the 50 percent active anionic surfactant is added to the solution, the viscosity of the solution becomes similar to water and the system becomes opaque (i.e., nearly equal amounts of anionic and cationic surfactants are present). Addition of 0.85 to 0.92 g of anionic surfactant provides a viscous solution.

A thickened aqueous liquid is prepared and has 99.5 percent water, 0.23 percent cetyltrimethylammonium salicylate and 0.23 percent sodium salicylate. The liquid is clear and exhibits viscoelastic properties. To this liquid is added toluene in incremental amounts. After an amount of toluene is added such that the concentration of toluene is about 0.1 percent, the liquid becomes opaque and viscoelastic properties are lost.

About 20 g of the broken liquid so treated is passed through a column using about 10 psi of pressure. The column is a copper tube of 0.05-inch diameter having a length of 28 inches and is filled with about 50 g of a uniform mixture of 80 percent 20–40 mesh silica sand and 20 percent styrene/divinylbenzene copolymer suspension beads having a particle size in the 200 micron range. Liquid passing through the column is thicker than the broken liquid but hazy. The liquid is passed through the column a second time using 60 psi of pressure. Liquid passing through the column is clear and exhibits viscoelastic properties.

What is claimed is:

1. A method for reversibly altering the viscosity of an aqueous liquid, the method comprising the steps of contacting the aqueous liquid with an amount of a viscoelastic surfactant comprising a surfactant ion having a hydrophobic moiety chemically bonded to an ionic, hydrophilic moiety and a counterion having a moiety capable of associating with the surfactant ion sufficient to increase the viscosity of the aqueous liquid and breaking the viscosity of the aqueous liquid containing the viscoelectric surfactant by contacting the liquid with an effective amount of a miscible or immiscible hydrocarbon or substituted hydrocarbon such that the viscosity of the liquid can subsequently be substantially restored.

2. The method of claim 1 wherein the viscoelastic surfactant is represented by the formula:

$$R_1(Z^-)A^+$$

wherein $R_1$ is a hydrophobic moiety, $Z^-$ is an anionic solubilizing moiety chemically bonded to $R_1$ and $A^+$ is a counterion associated with $Z^-$.

3. The method of claim 1 wherein the liquid contains a stoichiometric excess amount of an electrolyte required to act as a counterion based on the amount of the surfactant ion.

4. The method of claim 1 wherein said surfactant composition is employed in an amount such that the aqueous liquid contains from about 0.01 to about 10 weight percent of the viscoelastic surfactant based on the weight of the viscoelastic surfactant and the aqueous liquid.

5. The method of claim 1 wherein the viscosity of said liquid is substantially restored by subjecting the liquid to conditions such that said hydrocarbon or substituted hydrocarbon vaporizes or is absorbed using a suitable absorbing material.

6. The method of claim 5 wherein the hydrocarbon or substituted hydrocarbon is removed from the liquid by vaporizing the hydrocarbon.

7. The method of claim 6 wherein the hydrocarbon or substituted hydrocarbon is employed in an amount of from about 0.2 to about 20 weight percent based on the weight of the liquid.

8. The method of claim 1 wherein the hydrocarbon or substituted hydrocarbon is an alcohol having from 1 to about 3 carbon atoms, acetone, methylethylketone, trichloroethylene, toluene, xylene, or a glycol ether.

9. The method of claim 8 wherein said hydrocarbon or substituted hydrocarbon is an alcohol having from 1 to about 3 carbon atoms.

10. The method of claim 1 wherein, after the viscosity of said liquid is substantially restored, additional surfactant composition is added thereto.

11. The method of claim 1 wherein said liquid is a drilling liquid.

12. A method for using a thickened aqueous liquid for carrying solids, the method comprising the steps of thickening the aqueous liquid with an amount of a viscoelastic surfactant comprising a surfactant ion having a hydrophobic moiety chemically bonded to an ionic, hydrophilic moiety and a counterion having a moiety capable of associating with the surfactant ion sufficient to provide the aqueous liquid with an improved solids carrying capacity over an unthickened liquid, suspending solids in the thickened liquid, and subsequently breaking the viscosity of the aqueous liquid without the need for increased shear so the solids can more effectively be removed from the liquid than from the thickened liquid.

13. The method of claim 12 wherein the viscosity is broken in a manner such that the viscosity of the liquid can be substantially restored without the need of providing additional viscoelastic surfactant to the liquid.

14. The method of claim 12 wherein the liquid is an aqueous liquid and the viscoelastic surfactant is represented by the formula:

$$R_1(Z^-)A^+$$

wherein $R_1$ is a hydrophobic moiety, $Z^-$ is an anionic solubilizing moiety chemically bonded to $R_1$ and $A^+$ is a counterion associated with Z.

15. The method of claim 12 wherein the liquid is an aqueous liquid and the viscoelastic surfactant is represented by the formula:

$$R_1(Y^+)X^-$$

wherein $R_1$ is a hydrophobic moiety, $Y^+$ is a cationic solubilizing moiety chemically bonded to $R_1$ and $X^-$ is a counterion associated with $Y^+$.

16. The method of claim 12 wherein the viscoelastic compound is a fluoroaliphatic species.

17. The method of claim 12 wherein the liquid contains an amount of an electrolyte which exceeds the stoichiometric amount of electrolyte required based on the amount of the surfactant ion.

18. The method of claim 17 wherein said viscoelastic surfactant is employed in an amount such that the aqueous liquid contains from about 0.01 to about 10 weight percent of the viscoelastic surfactant based on the weight of the viscoelastic surfactant and the aqueous liquid.

19. The method of claim 18 wherein the viscosity of the said liquid is broken by contacting said liquid with an effective amount of a miscible or immiscible hydrocarbon or substituted hydrocarbon.

20. The method of claim 19 wherein the viscosity of said liquid is substantially restored by subjecting the liquid to conditions such that said hydrocarbon or substituted hydrocarbon vaporizes or is absorbed using a suitable absorbing material.

21. The method of claim 20 wherein said hydrocarbon or substituted hydrocarbon is an alcohol having from 1 to 3 carbon atoms.

22. The method of claim 21 wherein, after the viscosity of said liquid is substantially restored, additional surfactant composition is added thereto.

23. The method of claim 22 wherein said liquid is a drilling liquid.

24. A method for reversibly altering the viscosity of an aqueous liquid, the method comprising the steps of contacting the aqueous liquid with an amount of a nonionic viscoelastic surfactant comprising a surfactant molecule having a hydrophobic moiety chemically bonded to a nonionic, hydrophilic moiety sufficient to increase the viscosity of the aqueous liquid and breaking the viscosity of the aqueous liquid containing the viscoelastic surfactant by contacting the liquid with an effective amount of a miscible or immiscible hydrocarbon or substituted hydrocarbon, whereby the viscosity of the liquid can subsequently be substantially restored.

25. The method of claim 24 wherein the substituted hydrocarbon is an alcohol having from 1 to about 3 carbon atoms.

26. The method of claim 24 wherein the viscosity of the liquid is substantially restored by subjecting the liquid to conditions such that the hydrocarbon or substituted hydrocarbon vaporizes or is absorbed using a suitable absorbing material.

27. The method of claim 24 wherein the liquid contains solids.

28. A method for reversibly altering the viscosity of an aqueous liquid, the method comprsiing the steps of contacting the aqueous liquid with a viscoelastic surfactant represented by the formula:

$$R_1(Y^\oplus)X^\ominus$$

wherein $R_1$ is a hydrophobic moiety, $Y^\oplus$ is a cationic solubilizing moiety chemically bonded to $R_1$ and $X^\ominus$ is a counterion associated with $Y^\oplus$, the viscoelastic surfactant being employed in an amount sufficient to increase the viscosity of the aqueous liquid, and breaking the viscosity of the aqueous liquid containing the viscoelastic surfactant by contacting the liquid containing the viscoelastic surfactant in a fashion such that the liquid does not need to be subjected to increased shear to reduce the viscosity and the viscosity of the liquid can subsequently be substantially restored.

29. The method of claim 28 wherein $R_1$ is hydrocarbyl or inertly substituted hydrocarbyl, $Y^\oplus$ is an onium ion and $X^\ominus$ contains a carboxylate, sulfonate or phenoxide group.

30. The method of claim 29 wherein $R_1$ is an alkenyl group or an alkyl group having at least 12 carbon atoms, or aralkyl group; $Y^\oplus$ is quaternary ammonium, pyridinium, or imidazolinium; and $X^\ominus$ is an aromatic carboxylate, an aromatic sulfonate or a phenoxide.

31. The method of claim 30 wherein $X^\ominus$ is o-hydroxybenzoate; m- or p-chlorobenzoate; methylene bis-salicylate; 3,4 or 3,5-dichlorobenzoate; p-toluene sulonate; or naphthalene sulfonate.

32. The method of claim 28 wherein the viscoelastic surfactant is represented by the formula:

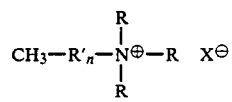

wherein $R'$ is saturated or unsaturated alkyl; n represens the number of carbon atoms in $R'$ and is an integer from about 13 to about 23; each R is independently hydrogen, an alkyl group, an alkylaryl or a hydroxyalkyl group having from 1 to about 4 carbon atoms; and $X^\ominus$ is o-hydroxy benzoate, m-or p-halobenzoate or an alkylphenate wherein the alkyl group is from 1 to about 4 carbon atoms.

33. The method of claim 28 wherein the viscosity of the liquid is broken by contacting the liquid with an effective amount of a miscible or immiscile hydrocarbon or substituted hydrocarbon.

34. The method of claim 33 wherein the hydrocarbon or substituted hydrocarbon is removed from the liquid by vaporizing the hydrocarbon.

35. The method of claim 33 wherein the hydrocarbon or substituted hydrocarbon is an alcohol having form 1 to about 3 carbon atoms, acetone, methylethylketone, trichloroethylene, toluene, xylene, or a glycol ether.

36. The method of claim 35 wherein the hydrocarbon or substituted hydrocarbon is employed in an amount of from about 0.2 to about 20 weight percent based on the weight of the liquid.

37. The method of claim 28 wherein the surfactant composition is employed in an amount such that the aqueous liquid contains from about 0.01 to about 10 weight percent of the viscoelastic surfactant based on the weight of the viscoelastic surfactant and the aqueous liquid.

38. A method for reversibly altering the viscosity of an aqueous liquid, the method comprising the steps of contacting the aqueous liquid with an amount of a fluoroaliphaitic viscoelastic surfactant compound represented by the formula $R_fZ^1$ wherein $R_f$ is a saturated or unsaturated fluoroaliphatic moiety and $Z^1$ is an ionic moiety or potentially ionic moiety sufficient to increase the viscosity of the aqueous liquid and breaking the viscosity of the aqueous liquid containing the viscoelastic surfactant in a fashion such that the liquid does not need to be subjected to increased shear to reduce the viscosity and the viscosity of the liquid can subsequently be substantially restored.

* * * * *